(12) United States Patent
Pereira et al.

(10) Patent No.: US 8,560,331 B1
(45) Date of Patent: Oct. 15, 2013

(54) AUDIO ACCELERATION

(75) Inventors: Rui Filipe Andrade Pereira, Aliso Viejo, CA (US); Andrew Buchanan Gault, Aliso Viejo, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 321 days.

(21) Appl. No.: 12/966,103

(22) Filed: Dec. 13, 2010

Related U.S. Application Data

(60) Provisional application No. 61/370,005, filed on Aug. 2, 2010.

(51) Int. Cl.
*H04N 21/80* (2011.01)

(52) U.S. Cl.
USPC .......................................................... 704/503

(58) Field of Classification Search
USPC .......................................................... 704/503
See application file for complete search history.

(56) References Cited

U.S. PATENT DOCUMENTS

| | | | |
|---|---|---|---|
| 4,372,558 A | 2/1983 | Shimamoto et al. | |
| 5,263,723 A | 11/1993 | Pearson et al. | |
| 5,411,270 A | 5/1995 | Naka et al. | |
| 5,553,864 A | 9/1996 | Sitrick | |
| 5,558,339 A | 9/1996 | Perlman | |
| 5,586,247 A | 12/1996 | Yoshifuji et al. | |
| 5,623,424 A | 4/1997 | Azadagan et al. | |
| 5,636,209 A | 6/1997 | Perlman | |
| 5,641,319 A | 6/1997 | Stoel et al. | |
| 5,685,775 A | 11/1997 | Bakoglu et al. | |
| 5,689,577 A | 11/1997 | Arata | |
| 5,696,892 A | 12/1997 | Redmann et al. | |
| 5,707,286 A | 1/1998 | Carlson | |
| 5,738,583 A | 4/1998 | Comas et al. | |
| 5,742,289 A | 4/1998 | Naylor et al. | |
| 5,775,996 A | 7/1998 | Othmer et al. | |
| 5,790,713 A | 8/1998 | Kamada et al. | |
| 5,793,985 A | 8/1998 | Natarajan et al. | |
| 5,828,370 A | 10/1998 | Moeller et al. | |
| 5,846,132 A | 12/1998 | Junkin | |
| 5,852,672 A | 12/1998 | Lu | |
| 5,878,283 A | 3/1999 | House et al. | |
| 5,884,101 A | 3/1999 | Wu | |

(Continued)

FOREIGN PATENT DOCUMENTS

| | | |
|---|---|---|
| EP | 1104686 A1 | 6/2001 |
| EP | 1479422 A2 | 11/2004 |

(Continued)

OTHER PUBLICATIONS

Unknown, "*T5 Labs Reveals Instant Gaming Platform*", Article Nov. 9, 2007, p. 1-8, http://www.edge-online.com.

(Continued)

*Primary Examiner* — Susan McFadden
(74) *Attorney, Agent, or Firm* — Martine Penilla Group, LLP

(57) ABSTRACT

An audio receiving system includes logic configured to reduce the accumulation of delays caused by the late arrival of audio packets. This logic is configured to accelerate or decelerate presentation of a resulting audio stream in response to the detection of late packets. The acceleration is discontinued once the effects of the late packets have been compensated for. The audio receiving system is typically applied to applications in which lag is undesirable. These can include web conferencing, telepresence, and online video games.

27 Claims, 3 Drawing Sheets

(56) References Cited

U.S. PATENT DOCUMENTS

| | | | |
|---|---|---|---|
| 5,889,499 A | 3/1999 | Nally et al. ........................ 345/7 |
| 5,899,810 A | 5/1999 | Smith |
| 5,905,988 A | 5/1999 | Schwartz et al. |
| 5,926,208 A | 7/1999 | Noonen et al. |
| 5,956,485 A | 9/1999 | Perlman |
| 5,966,129 A | 10/1999 | Matsukuma et al. |
| 5,974,442 A | 10/1999 | Adams |
| 5,974,503 A | 10/1999 | Venkatesh et al. |
| 5,991,443 A | 11/1999 | Gallery et al. |
| 6,005,561 A | 12/1999 | Hawkins et al. |
| 6,015,344 A | 1/2000 | Kelly et al. |
| 6,025,801 A | 2/2000 | Beitel |
| 6,039,648 A | 3/2000 | Guinn et al. |
| 6,050,898 A | 4/2000 | Vange et al. |
| 6,102,969 A | 8/2000 | Christianson et al. ........ 717/146 |
| 6,115,038 A | 9/2000 | Christofferson et al. |
| 6,128,660 A | 10/2000 | Grimm et al. |
| 6,152,824 A | 11/2000 | Rothschild et al. |
| 6,210,274 B1 | 4/2001 | Carlson |
| 6,238,290 B1 | 5/2001 | Tarr et al. |
| 6,241,612 B1* | 6/2001 | Heredia ........................ 463/42 |
| 6,272,223 B1 | 8/2001 | Carlson |
| 6,300,952 B1 | 10/2001 | Sidwell et al. |
| 6,342,892 B1 | 1/2002 | Van Hook et al. ............ 345/503 |
| 6,370,564 B2 | 4/2002 | Bretscher |
| 6,390,922 B1 | 5/2002 | Vange et al. |
| 6,409,602 B1 | 6/2002 | Wiltshire et al. |
| 6,415,317 B1 | 7/2002 | Yelon et al. |
| 6,426,748 B1 | 7/2002 | Megahed |
| 6,428,413 B1 | 8/2002 | Carlson |
| 6,453,334 B1 | 9/2002 | Vinson et al. |
| 6,475,090 B2 | 11/2002 | Roelofs |
| 6,539,354 B1 | 3/2003 | Sutton et al. |
| 6,583,793 B1 | 6/2003 | Gould et al. |
| 6,587,109 B1 | 7/2003 | Rose et al. |
| 6,606,746 B1 | 8/2003 | Zdepski et al. |
| 6,665,453 B2 | 12/2003 | Scheurich |
| 6,665,872 B1 | 12/2003 | Krishnamurthy et al. |
| 6,687,663 B1 | 2/2004 | McGrath et al. |
| 6,754,241 B1 | 6/2004 | Krishnamurthy et al. |
| 6,755,743 B1 | 6/2004 | Yamashita et al. |
| 6,763,371 B1 | 7/2004 | Jandel |
| 6,791,579 B2 | 9/2004 | Markel |
| 6,792,615 B1 | 9/2004 | Rowe et al. |
| 6,810,528 B1 | 10/2004 | Chatani |
| 6,848,997 B1 | 2/2005 | Hashimoto et al. |
| 6,863,612 B2 | 3/2005 | Willis |
| 6,884,172 B1 | 4/2005 | Lloyd et al. |
| 6,908,390 B2 | 6/2005 | Nguyen et al. |
| 6,918,113 B2 | 7/2005 | Patel et al. |
| 6,959,320 B2 | 10/2005 | Shah et al. |
| 6,963,353 B1 | 11/2005 | Firestone |
| 6,970,910 B2 | 11/2005 | Murai |
| 6,986,055 B2 | 1/2006 | Carlson |
| 6,996,742 B2 | 2/2006 | Lerman et al. |
| 7,023,918 B2 | 4/2006 | Yu et al. |
| 7,038,676 B2 | 5/2006 | Iwata et al. |
| 7,043,524 B2 | 5/2006 | Shah et al. |
| 7,062,567 B2 | 6/2006 | Benitez et al. |
| 7,072,693 B2 | 7/2006 | Farlow et al. |
| 7,075,993 B2 | 7/2006 | O'Brien, Jr. |
| 7,090,577 B2 | 8/2006 | Serizawa et al. .................. 463/6 |
| 7,096,253 B2 | 8/2006 | Vinson et al. .................. 709/203 |
| 7,133,368 B2 | 11/2006 | Zhang et al. |
| 7,135,985 B2 | 11/2006 | Woolgar et al. |
| 7,158,679 B2 | 1/2007 | Sano et al. |
| 7,227,894 B2 | 6/2007 | Lin et al. .................. 375/240.12 |
| 7,240,162 B2 | 7/2007 | de Vries |
| 7,246,183 B2 | 7/2007 | Covington et al. |
| 7,260,834 B1 | 8/2007 | Carlson |
| 7,270,605 B2 | 9/2007 | Russell et al. |
| 7,274,368 B1 | 9/2007 | Keslin |
| 7,275,987 B2 | 10/2007 | Shimakawa et al. ............ 463/9 |
| 7,292,588 B2 | 11/2007 | Milley et al. |
| 7,295,608 B2 | 11/2007 | Reynolds et al. |
| 7,297,062 B2 | 11/2007 | Gatto et al. |
| 7,299,487 B1 | 11/2007 | Campbell et al. |
| 7,305,697 B2 | 12/2007 | Alao et al. |
| 7,448,063 B2 | 11/2008 | Freeman et al. ............... 725/136 |
| 7,451,196 B1 | 11/2008 | de Vries et al. |
| 7,577,751 B2 | 8/2009 | Vinson et al. |
| 7,587,520 B1 | 9/2009 | Kent et al. |
| 7,721,117 B2 | 5/2010 | Sherer et al. |
| 7,731,586 B2 | 6/2010 | Letovsky et al. |
| 7,739,715 B2 | 6/2010 | He et al. |
| 7,751,480 B2 | 7/2010 | Yavits et al. |
| RE41,618 E | 8/2010 | Florscheutz |
| 7,804,856 B2 | 9/2010 | Krause et al. .................. 370/486 |
| 7,818,444 B2 | 10/2010 | Brueck et al. |
| 7,818,769 B2 | 10/2010 | Peacock et al. .................. 725/54 |
| 7,864,186 B2 | 1/2011 | Robotham et al. |
| 7,877,776 B2 | 1/2011 | Krikorian et al. |
| 7,916,147 B2 | 3/2011 | Clemie et al. |
| 7,936,819 B2 | 5/2011 | Craig et al. |
| 7,953,883 B2 | 5/2011 | Thomas et al. ................ 709/231 |
| 8,081,192 B2 | 12/2011 | Clemie et al. .................. 345/522 |
| 8,095,400 B2 | 1/2012 | Herde et al. ........................ 705/5 |
| 8,152,631 B2 | 4/2012 | Anderson ........................ 463/25 |
| 8,203,568 B2 | 6/2012 | Clemie et al. .................. 345/522 |
| 8,335,873 B2* | 12/2012 | Tinsman ........................ 710/52 |
| 2001/0044339 A1 | 11/2001 | Cordero et al. |
| 2002/0030675 A1 | 3/2002 | Kawai |
| 2002/0034980 A1 | 3/2002 | Lemmons et al. |
| 2002/0053075 A1 | 5/2002 | Paz et al. |
| 2002/0056120 A1 | 5/2002 | McTernan et al. |
| 2002/0059637 A1 | 5/2002 | Rakib |
| 2002/0061062 A1 | 5/2002 | O'Brien |
| 2002/0073429 A1 | 6/2002 | Beane et al. |
| 2002/0075382 A1 | 6/2002 | Cohen |
| 2002/0083461 A1 | 6/2002 | Hutcheson et al. |
| 2002/0111212 A1 | 8/2002 | Muir |
| 2002/0115487 A1 | 8/2002 | Wells |
| 2002/0128065 A1 | 9/2002 | Chung et al. |
| 2002/0154691 A1 | 10/2002 | Kost et al. |
| 2002/0166119 A1 | 11/2002 | Cristofalo |
| 2002/0184303 A1 | 12/2002 | Uner |
| 2002/0186769 A1 | 12/2002 | O'Brien |
| 2002/0191699 A1 | 12/2002 | O'Brien |
| 2002/0191701 A1 | 12/2002 | O'Brien, Jr. |
| 2003/0004882 A1 | 1/2003 | Holler et al. |
| 2003/0037156 A1 | 2/2003 | Mallart |
| 2003/0048808 A1 | 3/2003 | Stahl et al. |
| 2003/0056112 A1 | 3/2003 | Vinson et al. |
| 2003/0060285 A1 | 3/2003 | Itakura |
| 2003/0072370 A1 | 4/2003 | Girod et al. |
| 2003/0083132 A1 | 5/2003 | Berg et al. ........................ 463/40 |
| 2003/0093806 A1 | 5/2003 | Dureau et al. |
| 2003/0130040 A1 | 7/2003 | Dripps |
| 2003/0152080 A1 | 8/2003 | O'Brien |
| 2003/0174772 A1 | 9/2003 | Voronov et al. |
| 2003/0174774 A1 | 9/2003 | Mock et al. |
| 2003/0177187 A1 | 9/2003 | Levine et al. |
| 2003/0190952 A1 | 10/2003 | Smith et al. ...................... 463/30 |
| 2003/0214502 A1 | 11/2003 | Park et al. |
| 2003/0228906 A1 | 12/2003 | Walker et al. .................... 463/40 |
| 2003/0234790 A1 | 12/2003 | Hochmuth et al. |
| 2004/0022391 A1 | 2/2004 | O'Brien |
| 2004/0034870 A1 | 2/2004 | O'Brien et al. |
| 2004/0052371 A1 | 3/2004 | Watanabe |
| 2004/0063498 A1 | 4/2004 | Oakes et al. |
| 2004/0064504 A1 | 4/2004 | Domschitz |
| 2004/0072091 A1 | 4/2004 | Mochizuki et al. |
| 2004/0102245 A1 | 5/2004 | Escalera et al. |
| 2004/0111755 A1 | 6/2004 | Perlman |
| 2004/0119716 A1 | 6/2004 | Park et al. |
| 2004/0155962 A1 | 8/2004 | Marks |
| 2004/0209660 A1 | 10/2004 | Carlson et al. |
| 2004/0222988 A1 | 11/2004 | Donnelly |
| 2004/0252632 A1 | 12/2004 | Bourdoux et al. |
| 2005/0024363 A1 | 2/2005 | Estrop |
| 2005/0054423 A1 | 3/2005 | Wadleigh ........................ 463/20 |
| 2005/0080915 A1 | 4/2005 | Shoemaker et al. |
| 2005/0100229 A1 | 5/2005 | Becker et al. |
| 2005/0104543 A1 | 5/2005 | Kazanov et al. |

(56) References Cited

U.S. PATENT DOCUMENTS

| | | |
|---|---|---|
| 2005/0104889 A1 | 5/2005 | Clemie et al. |
| 2005/0125825 A1 | 6/2005 | Nakayama |
| 2005/0174771 A1 | 8/2005 | Conner |
| 2005/0193139 A1 | 9/2005 | Vinson et al. |
| 2005/0193209 A1 | 9/2005 | Saunders et al. |
| 2005/0282636 A1 | 12/2005 | O'Brien |
| 2005/0283734 A1 | 12/2005 | Santoro et al. |
| 2005/0286777 A1 | 12/2005 | Kumar et al. |
| 2006/0038879 A1 | 2/2006 | Kremen |
| 2006/0048136 A1 | 3/2006 | Vries et al. |
| 2006/0050972 A1 | 3/2006 | Reznic et al. |
| 2006/0069623 A1 | 3/2006 | MacDonald Korth et al. |
| 2006/0069796 A1 | 3/2006 | Lucas et al. |
| 2006/0069797 A1 | 3/2006 | Abdo et al. |
| 2006/0104353 A1 | 5/2006 | Johnson et al. |
| 2006/0117344 A1 | 6/2006 | Lamkin et al. |
| 2006/0121991 A1 | 6/2006 | Borinik et al. .................. 463/43 |
| 2006/0123185 A1 | 6/2006 | de Vries et al. |
| 2006/0126728 A1 | 6/2006 | Yu et al. |
| 2006/0146057 A1 | 7/2006 | Blythe ........................... 345/506 |
| 2006/0165235 A1 | 7/2006 | Carlson |
| 2006/0168294 A1 | 7/2006 | de Vries et al. |
| 2006/0195884 A1 | 8/2006 | van Zoest et al. |
| 2006/0218225 A1 | 9/2006 | Hee Voon et al. ............. 709/201 |
| 2006/0224761 A1 | 10/2006 | Howarth et al. .............. 709/231 |
| 2006/0230175 A1 | 10/2006 | de Vries |
| 2006/0230428 A1 | 10/2006 | Craig et al. .................... 725/133 |
| 2006/0258463 A1 | 11/2006 | Cugno et al. |
| 2006/0262979 A1 | 11/2006 | Srinivasan et al. |
| 2006/0282855 A1 | 12/2006 | Margulis |
| 2007/0005795 A1 | 1/2007 | Gonzalez |
| 2007/0009035 A1 | 1/2007 | Craig et al. |
| 2007/0011712 A1 | 1/2007 | White et al. |
| 2007/0036462 A1 | 2/2007 | Crandall et al. |
| 2007/0047901 A1 | 3/2007 | Ando et al. |
| 2007/0058937 A1 | 3/2007 | Ando et al. |
| 2007/0121629 A1 | 5/2007 | Cuijpers et al. |
| 2007/0155507 A1 | 7/2007 | Gatto et al. .................... 463/42 |
| 2007/0168466 A1 | 7/2007 | Tooley et al. |
| 2007/0172133 A1 | 7/2007 | Kim et al. |
| 2007/0202941 A1 | 8/2007 | Miltenberger et al. |
| 2007/0211720 A1 | 9/2007 | Fuchs et al. |
| 2007/0226364 A1 | 9/2007 | Landspurg |
| 2007/0254742 A1 | 11/2007 | O'brien |
| 2007/0260677 A1 | 11/2007 | DeMarco et al. |
| 2007/0265073 A1 | 11/2007 | Novi et al. |
| 2007/0265094 A1 | 11/2007 | Tone et al. ....................... 463/42 |
| 2007/0266170 A1 | 11/2007 | Mockett |
| 2007/0275780 A1 | 11/2007 | Sloate et al. |
| 2008/0008439 A1 | 1/2008 | Liu et al. |
| 2008/0015003 A1 | 1/2008 | Walker et al. |
| 2008/0025390 A1 | 1/2008 | Shi et al. |
| 2008/0032788 A1 | 2/2008 | Carlson |
| 2008/0039204 A1 | 2/2008 | Ackley et al. |
| 2008/0045338 A1 | 2/2008 | Walker et al. |
| 2008/0089423 A1 | 4/2008 | Karczewicz |
| 2008/0109876 A1 | 5/2008 | Hitomi et al. |
| 2008/0133715 A1 | 6/2008 | Yoneda et al. |
| 2008/0146342 A1 | 6/2008 | Harvey et al. |
| 2008/0178298 A1 | 7/2008 | Arai et al. |
| 2008/0194332 A1 | 8/2008 | Kadikario et al. |
| 2008/0194334 A1 | 8/2008 | Kuok et al. |
| 2008/0195743 A1 | 8/2008 | Brueck et al. |
| 2008/0207322 A1 | 8/2008 | Mizrahi ........................ 463/32 |
| 2008/0234047 A1 | 9/2008 | Nguyen ........................ 463/42 |
| 2008/0254891 A1 | 10/2008 | Saunders et al. |
| 2008/0261679 A1 | 10/2008 | Carlson |
| 2008/0268947 A1 | 10/2008 | Fyock et al. |
| 2008/0279183 A1 | 11/2008 | Wiley et al. |
| 2008/0284798 A1 | 11/2008 | Weybrew et al. ............. 345/630 |
| 2008/0287181 A1 | 11/2008 | Carlson |
| 2008/0288380 A1 | 11/2008 | Nam et al. |
| 2008/0291208 A1 | 11/2008 | Keall ........................... 345/506 |
| 2009/0062014 A1 | 3/2009 | Gift et al. |
| 2009/0081964 A1 | 3/2009 | Buznach |
| 2009/0093312 A1 | 4/2009 | Carlson |
| 2009/0103607 A1 | 4/2009 | Bajpai et al. |
| 2009/0118017 A1 | 5/2009 | Perlman et al. ................. 463/42 |
| 2009/0118018 A1 | 5/2009 | Perlman |
| 2009/0118019 A1 | 5/2009 | Perlman |
| 2009/0119458 A1 | 5/2009 | de Vries et al. |
| 2009/0119644 A1 | 5/2009 | de Vries et al. |
| 2009/0119729 A1 | 5/2009 | Perlman |
| 2009/0119730 A1 | 5/2009 | Perlman |
| 2009/0119731 A1 | 5/2009 | Perlman |
| 2009/0119736 A1 | 5/2009 | Perlman |
| 2009/0119737 A1 | 5/2009 | Perlman |
| 2009/0119738 A1 | 5/2009 | Perlman |
| 2009/0122878 A1 | 5/2009 | Liu et al. |
| 2009/0124387 A1 | 5/2009 | Perlman |
| 2009/0125961 A1 | 5/2009 | Perlman |
| 2009/0125967 A1 | 5/2009 | Perlman |
| 2009/0125968 A1 | 5/2009 | Perlman |
| 2009/0131177 A1 | 5/2009 | Pearce |
| 2009/0147292 A1 | 6/2009 | Shimura et al. |
| 2009/0196516 A1 | 8/2009 | Perlman |
| 2009/0213871 A1 | 8/2009 | Carlson et al. |
| 2009/0213927 A1 | 8/2009 | Perlman |
| 2009/0213935 A1 | 8/2009 | Van Der Laan et al. |
| 2009/0215531 A1 | 8/2009 | Perlman |
| 2009/0215540 A1 | 8/2009 | Perlman |
| 2009/0220001 A1 | 9/2009 | van der Laan et al. |
| 2009/0220002 A1 | 9/2009 | van der Laan et al. |
| 2009/0225076 A1 | 9/2009 | Vlietinck |
| 2009/0225220 A1 | 9/2009 | van der Laan et al. |
| 2009/0225828 A1 | 9/2009 | Perlman et al. |
| 2009/0225863 A1 | 9/2009 | Perlman et al. |
| 2009/0228936 A1 | 9/2009 | Davis et al. |
| 2009/0228946 A1 | 9/2009 | Perlman et al. |
| 2009/0234938 A1 | 9/2009 | Amsterdam et al. |
| 2009/0234940 A1 | 9/2009 | Pal et al. |
| 2009/0238267 A1 | 9/2009 | Li et al. |
| 2009/0238405 A1 | 9/2009 | Buznach |
| 2009/0239666 A1 | 9/2009 | Hall et al. |
| 2009/0245373 A1 | 10/2009 | Tourapis et al. |
| 2009/0247295 A1 | 10/2009 | Weldon et al. |
| 2009/0257668 A1 | 10/2009 | Ye et al. |
| 2009/0264202 A1 | 10/2009 | Chen et al. |
| 2009/0268821 A1 | 10/2009 | Au et al. |
| 2009/0276402 A1 | 11/2009 | Stiers .............................. 707/3 |
| 2009/0278842 A1 | 11/2009 | Peterfreund |
| 2009/0280908 A1 | 11/2009 | Carroll et al. |
| 2009/0289945 A1 | 11/2009 | Peterfreund et al. |
| 2009/0305790 A1 | 12/2009 | Lu et al. |
| 2009/0307367 A1 | 12/2009 | Gigliotti |
| 2009/0322784 A1 | 12/2009 | Sartori |
| 2010/0005503 A1 | 1/2010 | Kaylor et al. |
| 2010/0014825 A1 | 1/2010 | Curtis et al. |
| 2010/0017439 A1 | 1/2010 | Chen et al. |
| 2010/0023640 A1 | 1/2010 | Vinson et al. |
| 2010/0023977 A1 | 1/2010 | Peterfreund |
| 2010/0035672 A1 | 2/2010 | Root |
| 2010/0045662 A1 | 2/2010 | Boothroyd et al. |
| 2010/0057939 A1 | 3/2010 | Zhang et al. |
| 2010/0061443 A1 | 3/2010 | Maman et al. |
| 2010/0064000 A1 | 3/2010 | Stroffolino |
| 2010/0079676 A1 | 4/2010 | Kritt et al. |
| 2010/0086023 A1 | 4/2010 | Cheung et al. |
| 2010/0104021 A1 | 4/2010 | Schmit |
| 2010/0124279 A1 | 5/2010 | Reddy et al. |
| 2010/0125455 A1 | 5/2010 | Wang et al. |
| 2010/0131776 A1 | 5/2010 | Ayars et al. |
| 2010/0131994 A1 | 5/2010 | O'Brien |
| 2010/0150525 A1 | 6/2010 | Walker |
| 2010/0158101 A1 | 6/2010 | Wu et al. |
| 2010/0161825 A1 | 6/2010 | Ronea et al. |
| 2010/0166054 A1 | 7/2010 | Wirick |
| 2010/0166056 A1 | 7/2010 | Perlman et al. |
| 2010/0166058 A1 | 7/2010 | Perlman et al. |
| 2010/0166062 A1 | 7/2010 | Perlman et al. |
| 2010/0166063 A1 | 7/2010 | Perlman et al. |
| 2010/0166064 A1 | 7/2010 | Perlman et al. |
| 2010/0166065 A1 | 7/2010 | Perlman et al. |
| 2010/0166066 A1 | 7/2010 | Perlman et al. |

(56) References Cited

U.S. PATENT DOCUMENTS

| | | |
|---|---|---|
| 2010/0166068 A1 | 7/2010 | Perlman et al. |
| 2010/0167809 A1 | 7/2010 | Perlman et al. |
| 2010/0167816 A1 | 7/2010 | Perlman et al. ............... 463/30 |
| 2010/0167823 A1 | 7/2010 | Winkler |
| 2010/0169502 A1 | 7/2010 | Knowlson et al. |
| 2010/0172309 A1 | 7/2010 | Forenza et al. |
| 2010/0172358 A1 | 7/2010 | Zuberi et al. |
| 2010/0172540 A1 | 7/2010 | Davis et al. |
| 2010/0178035 A1 | 7/2010 | Xie |
| 2010/0178986 A1 | 7/2010 | Davis et al. |
| 2010/0185448 A1 | 7/2010 | Meisel |
| 2010/0195977 A1 | 8/2010 | Bennett et al. |
| 2010/0205023 A1 | 8/2010 | Wagner |
| 2010/0214301 A1 | 8/2010 | Li et al. |
| 2010/0248817 A1 | 9/2010 | Anderson ............... 463/25 |
| 2010/0317443 A1 | 12/2010 | Cook et al. ............... 463/42 |
| 2011/0045913 A1 | 2/2011 | Walker et al. |
| 2011/0107220 A1 | 5/2011 | Perlman |
| 2011/0122063 A1 | 5/2011 | Perlman et al. |
| 2011/0275430 A1 | 11/2011 | Walker et al. |
| 2012/0004024 A1 | 1/2012 | Bryant et al. |
| 2012/0004039 A1 | 1/2012 | Perry et al. ............... 463/42 |
| 2012/0004040 A1 | 1/2012 | Pereira et al. ............... 463/42 |
| 2012/0004041 A1 | 1/2012 | Pereira et al. ............... 463/42 |
| 2012/0004042 A1 | 1/2012 | Perry et al. ............... 463/42 |
| 2012/0064976 A1 | 3/2012 | Gault et al. ............... 463/42 |
| 2012/0172124 A1 | 7/2012 | Estrop et al. ............... 463/31 |
| 2012/0200583 A1 | 8/2012 | Clemie et al. ............... 345/522 |

FOREIGN PATENT DOCUMENTS

| | | |
|---|---|---|
| KR | 20020086835 A2 | 11/2002 |
| WO | WO 9814898 | 4/1998 |
| WO | WO 0242921 A1 | 5/2002 |
| WO | WO 02060183 A1 | 8/2002 |
| WO | WO 02103996 A2 | 12/2002 |
| WO | WO 03075116 | 4/2003 |
| WO | WO 03047710 A2 | 6/2003 |
| WO | WO 03047710 A3 | 6/2003 |
| WO | WO 03/075116 | 9/2003 |
| WO | WO 03075116 A2 | 9/2003 |
| WO | WO 2006011153 A2 | 2/2006 |
| WO | WO 2007130012 A1 | 11/2007 |
| WO | 2009073792 A1 | 6/2009 |
| WO | 2009073795 A1 | 6/2009 |
| WO | 2009073796 A1 | 6/2009 |
| WO | 2009073797 A1 | 6/2009 |
| WO | 2009073798 A1 | 6/2009 |
| WO | 2009073799 A1 | 6/2009 |
| WO | 2009073800 A1 | 6/2009 |
| WO | 2009073801 A1 | 6/2009 |
| WO | 2009073802 A1 | 6/2009 |
| WO | 2009073819 A1 | 6/2009 |
| WO | 2009073823 A1 | 6/2009 |
| WO | 2009073824 A1 | 6/2009 |
| WO | 2009073825 A1 | 6/2009 |
| WO | 2009073826 A1 | 6/2009 |
| WO | WO 2009073827 A1 | 6/2009 |
| WO | WO 2009073828 A1 | 6/2009 |
| WO | WO 2009073830 A1 | 6/2009 |
| WO | WO 2009073831 A1 | 6/2009 |
| WO | WO 2009073832 A1 | 6/2009 |
| WO | WO 2009073833 A1 | 6/2009 |
| WO | WO 2009076172 A2 | 6/2009 |
| WO | WO 2009076177 A1 | 6/2009 |
| WO | WO 2009076178 A1 | 6/2009 |
| WO | PCT/US10/36936 | 6/2010 |
| WO | PCT/US10/36977 | 6/2010 |
| WO | PCT/US11/051461 | 9/2011 |
| WO | PCT/US11/051468 | 9/2011 |

OTHER PUBLICATIONS

Parfitt, "*Pay for Play*" gaming a reality—Article Nov. 20, 2007, p. 1-7, http://www.mcvuk.com.

Schramm, "Onlive calls T5 Labs claim to key game streaming patent irrelevant"—Article Feb. 15, 2011, VentureBeat.
Takahashi, "*Who invented cloud gaming? T5 Labs tangles with Onlive*"—Article Feb. 15, 2011, p. 1-4, venturebeat.com.
Onlive Fans blog—Blog Feb. 17, 2011, p. 1-8, http://onlivefans.com.
Unknown, "*New Virtual Game Console From T5 Labs Makes PC Games Playable on Televisions*"—Article Nov. 12, 2011, PR Newswire UK, http://www.prnewswire.co.uk.
U.S. Appl. No. 11/499,524, filed Aug. 3, 2006, Perry, Online Game Customer Lead Generation.
U.S. Appl. No. 12/966,145, filed Dec. 13, 2010, Pereira, Audio Deceleration.
U.S. Appl. No. 12/790,955, filed May 31, 2010, Gault, Game Execution Environments.
U.S. Appl. No. 13/109,932, filed May 17, 2011, Perry, Qualified Video Delivery Methods.
U.S. Appl. No. 12/826,130, filed Jun. 29, 2010, Gault, Video Game Overlay.
U.S. Appl. No. 12/791,819, filed Dec. 13, 2010, Perry, Audio Acceleration.
U.S. Appl. No. 12/826,489, filed Jun. 29, 2010, Pereira, Voice Overlay.
U.S. Appl. No. 12/790,948, filed May 31, 2010, Pereira, Bufferless H.264 Variant.
U.S. Appl. No. 13/231,850, filed Sep. 13, 2011, Pereira, Program Mode Switching.
U.S. Appl. No. 13/231,790, filed Sep. 13, 2011, Perry, Dual-Mode Program Execution.
U.S. Appl. No. 13/231,873, filed Sep. 13, 2011, Perry, Intelligent Game Loading.
U.S. Appl. No. 13/231,883, filed Sep. 13, 2011, Gault, Add-on Management Methods.
U.S. Appl. No. 13/231,862, filed Sep. 13, 2011, Pereira, Program Mode Transition.
U.S. Appl. No. 13/231,810, filed Sep. 13, 2011, Perry, Dual-Mode Program Execution.
U.S. Appl. No. 13/231,751, filed Sep. 13, 2011, Gault, Add-on Management Systems.
U.S. Appl. No. 11/499,524, filed Aug. 3, 2006 (Perry)—Final Office Action Issued Sep. 14, 2011.
G-Cluster E3 2001—Play Harder.
PCT/US2010/036977, International Preliminary Report on Patentability, Dec. 15, 2011.
PCT/US2010/036936, International Preliminary Report on Patentability, Dec. 15, 2011.
U.S. Appl. No. 12/826,489, Rui Filipe Andrade Pereira, Non-Final Office Action issued Mar. 6, 2012.
PCT/US2011/51468, International Search Report and Written Opinion, Feb. 1, 2012.
Buck, Ian et al., Tracking Graphics State for Networked Rendering, Stanford University, , Proc., SIGGRAPH/EurographicsWorkshop on Graphics Hardware, 2000.
Humphreys, et al., Chromium: A Stream-Processing Framework for Interactive Rendering on Clusters, Proc. International Conference on Computer Graphics and Interactive Techniques, 2002.
Humphreys, et al., Distributed Rendering for Scalable Displays, IEEE Supercomputing 2000, Oct. 2000.
Hotel Room—Streaming Games, LodgeNet. http://www.youtube.com/watch?v=QR3mVSOlky8.
In-Flight Entertainment—Streaming Games—Panasonic's System 2000E. http://panasonic.aero/AboutUs/ProductHistory.aspx.
U.S. Appl. No. 12/826,130, Andrew Buchanan Gault, Non-Final Office Action issued Apr. 17, 2012.
PCT/US2011/051461 International Search Report and Written Opinion, issued Apr. 9, 2012.
Bangun, Ricky A., et al., A Network Architecture for Multiuser Networked Games on Demand, International Conference on Information, Cummunications and Signal Processing, ICICS '97, pp. 1815-1819, Sep. 9-12, 1997.
BostonFUG April Writeup: Chris Allen on Brassmonkey Wifi Game Controller, Ira's website, pp. 1-2, Apr. 13, 2010, http://irahochman.com/content/bostonfug-april-writeup-chris-allen-brassmonkey-wifi-game-controller.

(56) References Cited

OTHER PUBLICATIONS

Clouds Without Stitches from End to End: The Ten Unique Runaware Cloud Advantages, Runaware White Paper, vol. Two, pp. 1-11 Jun. 2010.
Cronin, Eric, et al., A Distributed Multiplayer Game Server System, Electrical Engineering and Computer Science Department, University of Michigan, May 4, 2001.
Diot, Christophe, et al., A Distributed Architecture for Multiplayer Interactive Applications on the Internet, IEEE Network, pp. 6-15, Jul./Aug. 1999.
Dripps's, Jeff, Profile, pp. 1-2.
Gautier, Laurent, et al., Design and Evaluation of MiMaze, a Multi-Player Game on the Internet, A-188, pp. 1-15.
G-Cluster gears up for US launch, Trey Walker, GameSpot, Posted Nov. 20, 2001, The wireless gaming network developer shows off its proprietary technology. pp. 1-3, http://uk.gamespot.com/news/2826174.html.
G-cluster, Game System for Broadband Neworks, Copyright 2002, G-cluster Ltd.
Hossain, AZM Ekram, et al., End-System Architecture for Distributed Networked Multimedia Applications: Issues, Trends and Future Directions, IEEE, pp. 452-455, 1999.
Jurgelionis, A., et al., Platform for Distributed 3D Gaming, International Journal of Computer Games Technology, vol. 2009, Article ID 231863, 15 pages, doi: 10.1155/2009/231863.
Kraetel IP-STB brings advanced gaming to TV sets together with Thirdspace and G-cluster, pp. 1-2, Sep. 5, 2002, http://www.gamecluster.com/kraetel.htm.
Levoy, Marc, Polygon-Assisted JPEG and MPEG Compression of Synthetic Images, Stanford University, pp. 21-28.
Lui, John C.S., et al., An Efficient Partitioning Algorithm for Distributed Virtual Environment Systems, IEEE, pp. 193-211, 2002.
MacKenzie, I. Scott, et al., Lag as a Determinant of Human Performance in Interactive Systems, INTERCHI '93, Apr. 24-29, 1993, pp. 488-493.
Nieh, Jason, et al., Measuring Thin-client Performance Using Slow-Motion Benchmarking, ACM Transactions on Computer Systems, vol. 21, No. 1, Feb. 2003, pp. 87-115.
Pantel, Lothar et al., On the Impact of Delay on Real-Time Multiplayer Games, NOSSDAV '02, May 12-14, 2002, Miami, Florida, pp. 23-29.
Park, Jaeyong, et al., Development of a Multiuser & Multimedia Game Engine Based on TCP/IP, IEEE, 1997.
PCT/IL98/00267, International Search Report, Sep. 30, 1998.
PCT/US01/41892, International Search Report, Dec. 17, 2001.
PCT/US06/39093, International Search Report, Feb. 28, 2007.
PCT/US07/13468, International Search Report, Mar. 3, 2008.
PCT/US07/17188, International Search Report, May 29, 2008.
PCT/US08/73780, International Search Report, Nov. 10, 2008.
PCT/US08/85556, International Search Report, Dec. 18, 2008.
PCT/US08/85558, International Search Report, Dec. 31, 2008.
PCT/US08/85595, International Search Report, Jan. 16, 2009.
PCT/US08/85601, International Search Report, Jan. 9, 2009.
PCT/US08/85603, International Search Report, Jan. 12, 2009.
PCT/US08/85605, International Search Report, Jan. 23, 2009.
PCT/US2008/085545, International Search Report, Jan. 23, 2009.
PCT/US2008/085546, International Search Report, Jan. 14, 2009.
PCT/US2008/085549, International Search Report, Jan. 23, 2009.
PCT/US2008/085550, International Search Report, Jan. 20, 2009.
PCT/US2008/085551, International Search Report, Jan. 21, 2009.
PCT/US2008/085554, International Search Report, Jan. 21, 2009.
PCT/US2008/085593, International Search Report, Jan. 21, 2009.
PCT/US2008/085598, International Search Report, Jan. 16, 2009.
PCT/US2008/085599, International Search Report, Jan. 21, 2009.
PCT/US2008/085600, International Search Report, Jan. 22, 2009.
PCT/US2008/085602, International Search Report, Jan. 13, 2009.
PCT/US2008/085606, International Search Report, Jan. 21, 2009.
PCT/US2008/085608, International Search Report, Jan. 20, 2009.
PCT/US2008/085609, International Search Report, Jan. 21, 2009.
PCT/US2008/085610, International Search Report, Jan. 21, 2009.
PCT/US2008/85560, International Search Report, Jan. 14, 2009.
PCT/US2010/036936, International Search Report and Written Opinion, Aug. 2, 2010.
PCT/US2010/036977, International Search Report and Written Opinion, Aug. 2, 2010.
Proceedings of the 2002 USENIX Annual Technical Conference, Monterey, California, USA, Jun. 10-15, 2002.
Testdrive, Runaware, Inc., pp. 1-2.
Try Before you Buy: Why Runaware TestDrive is a Great, Low Cost First Step into the Clouds, Runaware White Paper, vol. One, pp. 1-11, Jun. 2010.
U.S. Appl. No. 12/334,819, David Perry, Non-Final Office Action issued Jul. 27, 2011.
Wu, Tsong-Ho, et al., Distributed Interactive Video System Design and Analysis, IEEE, pp. 100-108, Mar. 1997.

* cited by examiner

AUDIO ACCELERATION

CROSS-REFERENCE TO RELATED APPLICATIONS

This application claims priority and benefit of U.S. Provisional Patent Application Ser. No. 61/370,005 filed Aug. 2, 2010 and entitled "Audio Acceleration and Deceleration." This application is related to U.S. patent application Ser. No. 12/826,130 filed Jun. 29, 2010 and entitled "Video Game Overlay," and U.S. patent application Ser. No. 12/826,489 filed Jun. 29, 2010 and entitled "Voice Overlay." The disclosures of the above provisional and non-provisional patent applications are hereby incorporated herein by reference.

BACKGROUND

1. Field of the Invention

The invention is in the field of audio communications and specifically in the field of audio processing over networks where packets may be delayed.

2. Related Art

Audio data communicated over networks, such as the Internet, is typically communicated as a sequential series of packets. Each packet includes the audio data, sequence information, destination information, etc. according to a standard such as TCP/IP. The packets are sent from a source to a receiver. Typically, the receiver includes a receive buffer with a limited capacity. A feedback loop is sometimes used to limit sending of packets from the source to times when space is available in the receive buffer. At the receiver, the audio data is assembled into an audio stream according to the sequence identification in each packet. This audio stream is typically presented to a user of the receiver in real time. The user is a person listening to the audio stream.

When using unpredictable networks, such as the internet, there is a possibility that a packet is received late. As used herein, the phrases "received late" and "late packet" are meant to characterize a packet that is received too late for the audio data within the packet to be seamlessly used in the audio stream. For a late packet the timing of the packet's receipt results in a gap or delay in the audio stream. This gap may be so small, e.g., on the order of a few microseconds, that it does not significantly affect the audio as perceived by the user. Or this gap may be long enough for the user to hear a disruption of the audio stream. In either case, when a packet arrives late, that part of the audio stream derived from audio data within the late audio packet both starts and finishes later than it would have if the packet had not been late.

The problems caused by late packets can be problematic in systems in which it is important that the audio stream be presented as quickly as possible to the user. These systems include, for example, web conferencing, telepresence, and streamed video gaming. In each of these systems it is desirable to minimize the lag time between when an event occurs at the audio receiver, audio data generation at the audio source that is dependent on this event, and/or presentation of the generated audio data to a user at the receiver. For example, in online video games, in which the game audio is generated at a remote game server and delivered to a client, the event may be receipt of a game command to shoot a gun. This game command is communicated from the client to the game server. At the game server audio, e.g., the sound of a gun shot, is generated and sent back to the client in data packets. At the client the audio data within the packets are assembled into an audio stream and presented to a user. It is desirable for the user's hearing of the gunshot to be as close as possible in time to the entry of the command to shoot. In order to minimize this time lag the receive buffer on the client is typically kept to a minimum size so that audio data is not stored in this buffer for too long. Unfortunately, the small receive buffer increases the probability that a delayed packet will result in an interruption of the resulting audio stream. Some modification of audio frequency has been performed in the prior art. See, for example, www.screemingbee.com. However, such systems change the frequency of sound without changing the time in which it takes to present.

SUMMARY

Some embodiments of the invention include systems and methods of reducing delays in the presentation of an audio stream that result from late arriving audio packets. Delays are reduced by accelerating the presentation of audio to a user after a late packet arrives. The acceleration includes presenting the audio more quickly than would otherwise occur. The acceleration is optionally performed in a stepwise manner so that abrupt changes in presentation rate are not perceived by the user.

The reduction in presentation delay is optionally applied to game audio received over a communication network from remote video game server. Such game systems inherently have a lag between the time a game player enters a game command on a client and a sound resulting from that game command is presented to the game player. Any delay in presentation of the audio to the game layer contributes to the this undesirable lag. As used herein, the term "game player" is used to refer to a person that plays a game and the term "game playing device" is used to refer to a device used to play a game.

The reduction in presentation delay may be applied to any system in which lag is undesirable, such as web conferencing and telepresence.

Various embodiments of the invention include an audio system comprising an input configured to receive audio packets via a communication network; audio monitoring logic configured to determine that one of the audio packets was late; audio decoding logic configured to convert the audio packets to an audio stream; audio processing logic configured to accelerate presentation of part of the audio stream to a user such that delay in the presentation of the audio stream is reduced; and an audio output configured for presenting the audio stream to the user.

Various embodiments of the invention include a method of communicating audio packets, the method comprising providing a computing instructions to a client over a communication network, the computing instructions being configured to: detect that a first audio packet was received late by the client, and accelerate a rate at which an audio stream is presented to a user based on the first audio packet being received late; and providing a series of audio packets to the client over the communication network, the series of audio packets including the first audio packet and being configured to be decoded to the audio stream.

Various embodiments of the invention include a method of processing audio packets, the method comprising receiving a first audio packet via a communication network; detecting that the first audio packet was received late; converting the first audio packet to part of an audio stream; accelerating a rate at which the audio stream is presented to a user based on the first audio packet being received late; and presenting the audio stream to the user at the accelerated rate.

Various embodiments of the invention include an audio system comprising an input configured to receive audio packets via a communication network; audio monitoring logic configured to anticipate that one of the audio packets will be late; audio decoding logic configured to convert the audio packets to an audio stream; audio processing logic configured to decelerate a presentation rate of part of the audio stream to a user such that a potential gap in the audio stream resulting from late receipt of one of the audio packets is reduced or eliminated; and an audio output configured for presenting the audio stream to the user at the decelerated presentation rate.

Various embodiments of the invention include a method of processing audio packets, the method comprising receiving a first audio packet via a communication network; converting the first audio packet to part of an audio stream; anticipating that a second audio packet will be received late and thereby cause a gap in the audio stream; decelerating a rate at which the part of the audio stream is presented to a user based on the anticipation that the second audio packet; and presenting the first audio packet to the user at the decelerated rate.

Various embodiments of the invention include a method of communicating audio packets, the method comprising providing a computing instructions to a client over a communication network, the computing instructions being configured to: anticipate that a second audio packet will be received late at the client and thereby cause a gap in an audio stream, and decelerate a rate at which audio data received in a first audio packet is presented to a user based on the anticipation that the second audio packet will be late; and providing a series of audio packets to the client over the communication network, the series of audio packets including the first audio packet and the second audio packet, and being configured to be decoded to the audio stream.

DETAILED DESCRIPTION

In systems where minimal lag is important, such as web conferencing, telepresence, and remotely played video games, momentary disruption of an audio stream is not the only problem that can be caused by late packets. Presentation to the user of that part of the audio stream generated from the late audio packet is started later than it otherwise would be. If that part of the audio stream is presented to the user as it was intended, e.g., 25 millisecond of audio stream would be intended to take 25 milliseconds to present, the presentation of that part of the audio stream would also end later than would be expected. The next part of the audio stream (resulting from the next audio packet in sequence) can only be presented after the prior part of the audio stream is finished. A part of an audio stream that ends later because of a packet that is received late, therefore, causes the next and subsequent parts of the audio stream to start late.

Delays in the presentation of an audio stream, as caused by late packets, contribute to the undesirable lag between events and resulting presentation of the audio stream. While individual delays of a few milliseconds can be somewhat manageable, the delay resulting from one late pack is added to the delay resulting from another late packet. Small delays, thus, accumulate into larger delays. These larger delays significantly increase lag.

Figure 1:
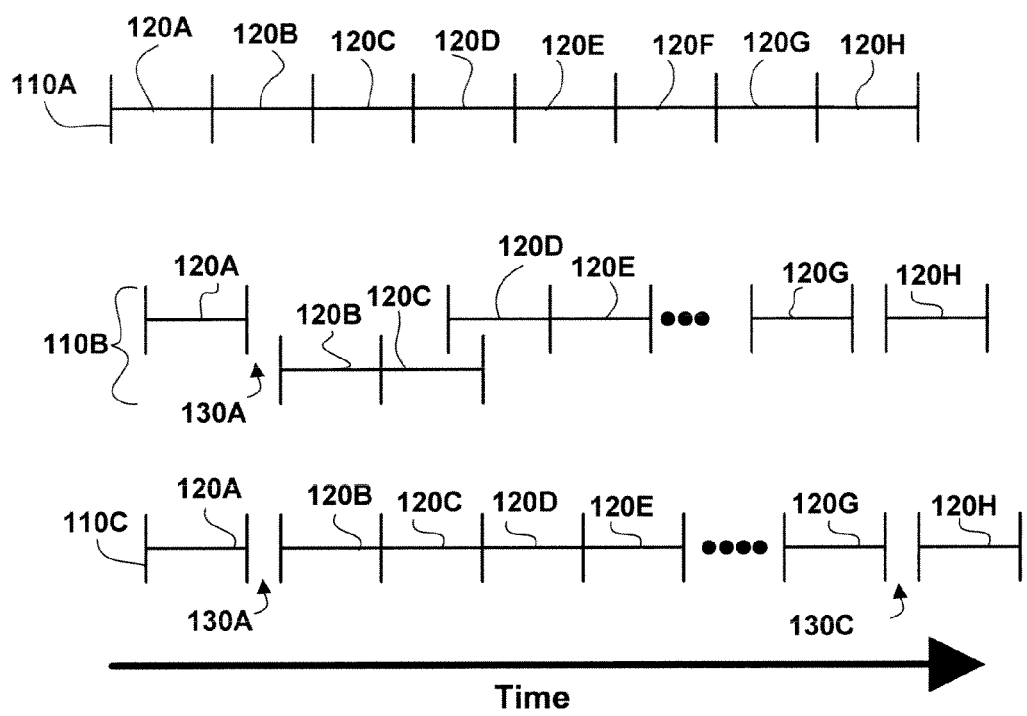
FIG. 1 illustrates how late packets have been found to result in cumulative delay in the presentation of audio packets.

FIG. 1 illustrates how late packets have been found to result in cumulative delay in the presentation of audio packets. FIG. 1 includes three timelines 110, individually labeled 110A, 110B and 110C. Timeline 110A illustrates an audio stream divided into Packets 120, as produced by an audio source at a server. Packets 120 are individually identified as 120A, 120B, 120C, etc. In the audio stream of Timeline 110A the packets are contiguous, without gaps.

Timeline 110B illustrates times at which Packets 120 are received at the client, and Timeline 110C illustrates times at which data from the Packets 120 are presented as an audio stream to a user of the client. Because of variability in the communication channel, some of Packets 120 are received late. For example, Packets 120B and 120C are received late. This results in a Gap 130A in the audio stream as presented to the user. The delay caused by Gap 130AB causes presentation of the audio within Packet 120B to start and end later than it would if Packet 120B had not been late. As a result, presentation of subsequent parts of the audio stream, generated using data from Packets 120C, 120D, 120E etc. all start and end later than they would have if Packet 120B would not have been late. This delay adds to the total lag of the system.

Because each packet takes a predetermined amount of time to present to the user, there is no prior art mechanism by which the delay can be eliminated without disruption of or a break in the audio stream. The delay is maintained for subsequent packets. This delay contributes to a lag in the audio signal.

As shown in Timeline 110C the next packet to be received late is Packet 120H. This late packet results in another delay in the presentation of audio stream to the user. This delay is represented by Gap 130C. The total delay in presentation of the audio to the user is now the sum of Gap 130B and Gap 130C. Even if these gaps are short they can accumulate until the total delay is a significant contribution to the total lag.

Figure 2:
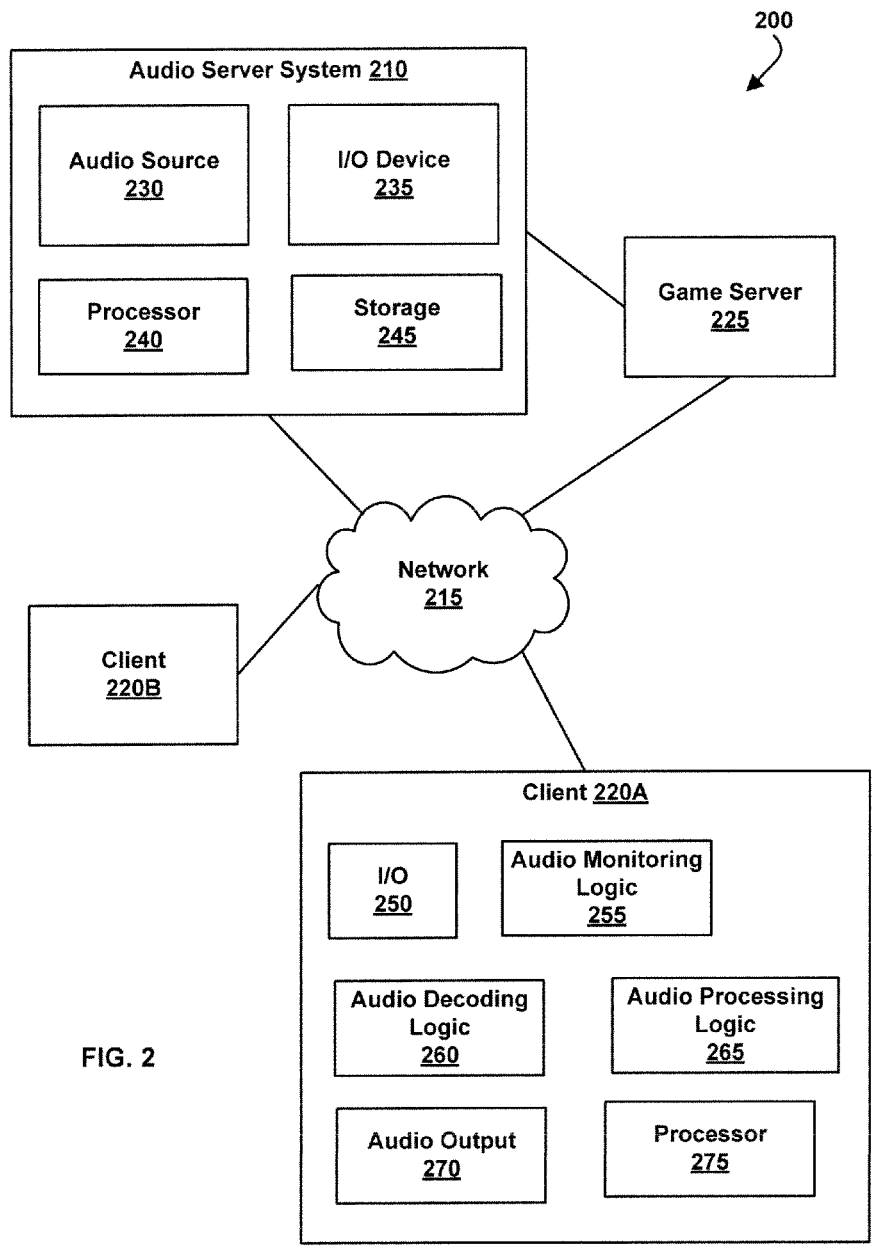
FIG. 2 is an illustration of an audio serving network, according to various embodiments of the invention.

FIG. 2 is an illustration of an Audio Serving Network 200, according to various embodiments of the invention. Audio Serving Network 200 includes one or more Clients 220 configured to receive audio data over a Network 215 from an Audio Server System 210. Audio Serving Network 200 optionally further includes a Game Server 225 configured to maintain a game state of a multi-player video game.

Audio Server System 210 is configured to provide audio data within Packets 120 to one or more of Clients 220 via Network 215. The audio packets are typically generated within Audio Server System 210 using an encoder configured to package audio data according to an encoding standard. Audio Server System 210 includes an Audio Source 230 configured to provide the audio data. For example, Audio Source 230 can include a microphone, sound generation logic, and/or an input configured to receive the audio data from an external source. In some embodiments, Audio Source 230 is configured to receive sound files from a Storage 245. These sound files can include data representing sound effects, music, audio messages, and/or voice data. In some embodiments Audio Source 230 is configured to receive audio data from one or more member of Clients 220, e.g., Client 220B, and provide that audio data to another member of Clients 220, e.g., Client 220A. Audio Source 230 includes hardware, firmware, and/or software stored on a computer readable medium.

Optional Storage 245 is typically a digital storage device such as digital memory, static memory, random access memory, a hard drive, an optical drive, and/or the like. Storage 245 is optionally distributed over several physical devices. Storage 245 is configured (e.g., by way of an appropriate data structure or file system) to store audio streams, audio data and/or audio files. In alternative embodiments, Storage 245 includes an analog storage device. In some embodiments, Storage 245 is configured to store the software components included in other parts of Audio Server system 210 or Client 220A discussed herein.

I/O Device 235 is configured for Audio Server System 210 to send and/or receive information such as audio, video, commands, requests for information, game states, client identities, player identities, game commands, security information, audio, and/or the like. I/O Device 235 typically includes communication hardware such as a network card or modem. I/O Device 235 is configured to communicate with Game Server 225, Network 215, and/or Clients 220.

I/O Device 235 is optionally configured to receive audio signals from a telepresence device such as a robot or remotely controlled vehicle. These telepresence devices may be considered part of Audio Server System 210.

Processor 240 is an electronic and/or optical processor configured to execute logic, e.g. software, included within the various components of Audio Server System 210 discussed herein. For example, Processor 240 may be programmed with software instructions in order to perform the functions of Audio Source 230, Game Server 225, and/or a I/O Device 235. Audio Server System 210 optionally includes more than one instance of Processor 240. Processor 240 may also be programmed with software instructions in order to execute commands received by Audio Server System 210, or to coordinate the operation of the various elements of Audio Serving Network 200 discussed herein. Processor 240 includes one or more hardware device.

Network 215 may be any type of communication network between computing devices including, a telephone network, the Internet, wireless networks, powerline networks, local area networks, wide area networks, private networks, and/or the like. In typical embodiments, the audio streams are communicated via standard protocols, such as TCP/IP or UDP/IP. Alternatively, the audio streams are communicated via proprietary standards.

Optional Game Server 225 is configured to maintain the state of a video game based on inputs from multiple geographically dispersed game players. Game Server 225 may be operated by a different entity than Audio Server System 210. For example, Game Server 225 may be operated by the publisher of a multiplayer game. In this example, Audio Server System 210 is optionally viewed as a client by Game Server 225 and optionally configured to appear from the point of view of Game Server 225 to be a prior art client executing a prior art game engine. Communication between Audio Server System 210 and Game Server 225 optionally occurs via Network 215. As such, Game Server 225 can be a prior art multiplayer game server that sends game state information to multiple clients, one of which is Game Server System 210. Video Server System 210 may be configured to communicate with multiple instances of Game Server 225 at the same time. For example, Audio Server System 210 can be configured to provide audio related to a plurality of different video games to different users. Each of these different video games may be supported by a different Game Server 225 and/or published by different entities. In some embodiments, several geographically distributed instances of Audio Server System 210 are configured to provide game audio to a plurality of different game players. Each of these instances of Audio Server System 210 may be in communication with the same instance of Game Server 225. Communication between Audio Server System 210 and one or more Game Server 225 optionally occurs via a dedicated communication channel. For example, Audio Server System 210 may be connected to Game Server 225 via a high bandwidth channel that is dedicated to communication between these two systems.

Clients 220, referred to herein individually as 220A, 220B, etc., may include, for example, terminals, personal computers, game consoles, tablet computers, telephones, televisions, MP3 players, headphones, stereo systems, set top boxes, kiosks, wireless devices, digital pads, stand-alone devices, handheld game playing devices, and/or the like. Typically, Clients 220 are configured to receive packets including audio data, decode the audio data into audio streams, and present the resulting audio stream to a user, e.g., a player of a game or the controller of a telepresence device. The audio streams may be presented to the user on a sound generation device integral to Client 220 or on a separate device such as headphones, speakers, a stereo, game player, or television. Clients 220 are configured to receive audio streams via Network 215.

A typical example of Clients 220 is a personal computer comprising a processor, non-volatile memory, a display, decoding logic, network communication capabilities, and input devices. The decoding logic may include hardware, firmware, and/or software stored on a computer readable medium. Systems for decoding (and encoding) audio streams are well known in the art and vary depending on the particular encoding scheme used.

Clients 220 may, but are not required to, further include systems configured for modifying received audio. For example, a client may be configured to perform filtering, to overlay one audio stream on another audio stream, and/or the like. A member of Clients 220 is optionally configured to receive more than one audio or video stream. Input devices of Clients 220 may include, for example, a keyboard, a joystick, a pointing device, a force feedback device, a motion and/or location sensing device, a mouse, a touch screen, a neural interface, a camera, input devices yet to be developed, and/or the like.

The number of clients included in Audio Serving Network 200 may vary widely from one or two to thousands, tens of thousands, or more. Further details of Client 220A are illustrated in FIG. 2. Other Clients 220 may include the same or similar features. Client 220A includes an I/O 250 configured for communicating via Network 215, various audio related logic, an Audio Output 270 and a Processor 275. The audio related logic includes Audio Monitoring Logic 255, Audio Decoding Logic 260, and Audio Processing Logic 265. These logic include hardware, firmware and/or software stored on a computer readable medium.

I/O 250 is configured for Client 220A to send and/or receive information such as audio, video, commands, requests for information, game states, client identities, player identities, game commands, security information, and/or the like. I/O 250 typically includes communication hardware such as a network card or modem, and is configured to communicate audio data using audio packets. In some embodiments, I/O 250 includes an Ethernet port. I/O 250 is configured to communicate with Game Server 225, Network 215, and/or Audio Server System 210.

Audio Monitoring Logic 255 is configured to monitor the receipt of audio packets and to determine that (if) one of the audio packets was received late, if this occurs. Audio Monitoring Logic 255 may operate by looking for gaps in an audio stream generated by Audio Decoding Logic 260, by monitoring times at which audio packets are received by I/O 250, by monitoring how many audio packets are in a receive buffer, by monitoring operation of Audio Decoding Logic 260, and/or the like. Audio Monitoring Logic 255 optionally uses a clock signal generated within Client 220A. When a late packet occurs, Audio Monitoring Logic 255 is configured to provide notice to Audio Processing Logic 265 of a late packet event. This notice optionally includes an amount of time that the packet was late, a number of late packets, a total time of delayed packets. In various embodiments, each of the late packets detected by Audio Monitoring Logic 255 can be at least 0.5, 1, 5, 10, 50 or 100 milliseconds late.

In some embodiments, Audio Monitoring Logic 255 is also configured to provide notice of late packets, and/or statistics regarding late packets to Audio Server System 210. This information can be used to characterize the reliability of a communication channel between Audio Source 230 and Client 220A. In some embodiments, Audio Monitoring Logic 255 is configured to detect if packets are received out of sequence and treat a packet received out of sequence as being late.

Audio Decoding Logic 260 is configured to convert audio packets into an audio stream that can be presented to a game player. Audio Decoding Logic 260 can include any decoder for decoding audio, including those presently well known in the art. Audio Decoding Logic 260 optionally includes systems and methods configured for filling gaps in an audio stream. For example, techniques know as error concealment may be used to fill gaps in the audio stream.

Audio Processing Logic 265 is configured to accelerate and/or decelerate presentation of the audio stream generated by Audio Decoding Logic 260 to a user. When presentation of the audio stream is accelerated the audio stream is presented to a game player in a shorter time than it would be if it were not accelerated. By presenting the audio stream in a shorter time, accumulated delay is reduced. Typically, the audio stream is accelerated when there is a delay in presentation of the audio stream and then decelerated (e.g., to normal speed) once the delay is reduced or eliminated.

The acceleration of audio presentation is optionally performed by sampling the audio data at a higher frequency than would otherwise occur. For example, audio data that was generated to be presented at 44k samples/second may be sampled at 44.2k samples/second to achieve a 0.5 percent acceleration. The higher sampling frequency may occur in a device driver, or in a sound card of Client 220A. The higher sampling frequency typically results in the audio being presented at a higher pitch. Deceleration of the rate at which audio is presented to a game player can similarly be accomplished by reducing the rate at which the audio data is sampled.

In some embodiments, acceleration of the rate at which audio is presented is accomplished by skipping data. For example, to increase the presentation rate by one percent, one of every hundred audio samples can be ignored instead of being presented. Methods for compensating for lost data packets and/or gaps, in which artificial audio data are generated, are optionally used to generate the transition data. Examples of these methods are discussed elsewhere herein. Alternatively, parts of the audio stream represented by more than one sample can be skipped to accelerate presentation of the audio stream as a whole. Part of the skipped data is optionally replaced by a smaller set of transition data. The transition data is configured to make the absence of the skipped data less apparent to a game player. Alternatively, when essentially identical adjacent audio data are found, a subset of these audio data may be ignored and not included in the audio stream. Not including these audio data causes the audio stream to be presented in a shorter period of time.

In some embodiments, deceleration of the rate at which audio is presented is accomplished by adding additional data to the audio stream and/or sampling some of the audio data more than once. For example, in order to achieve a 10 percent deceleration every tenth data element may be sampled twice. This results in two copies of the twice sampled data element being presented to the user. Sampling a data element twice can be accomplished by either sampling the same data element two times or by making a copy of the data element and sampling each copy twice. The type and size of a data element is typically dependant on the particular encoding scheme used. In various embodiments, data elements can be at least 2, 4 8 16, 32 or more bytes in size.

Acceleration and deceleration of audio packet presentation is optionally performed in a stepwise manner. For example, if an acceleration of ~5 percent is desired this acceleration can be achieved by increasing the rate at which the audio stream is presented in five steps of 1 percent each, or ten steps of 0.5 percent each. By changing the rate at which the audio stream is presented in a series of small steps, the acceleration is less likely to be perceived by the game player relative to making one larger step. In various embodiments the steps are less than or equal to, for example, 0.1, 0.5, 1, 2, 5, or 10 percent. An acceleration of 10 percent means that the time required to present the accelerated part of the audio stream is reduced by 10 percent. The total amount of acceleration or deceleration achieved by a number of steps can be greater than 0.2, 0.5, 1, 2, 3, 5, 10, or 15 percent. Optionally, deceleration is applied more aggressively than acceleration.

Acceleration and deceleration of audio packets are optionally performed between parts of the audio stream generated from different data packets. For example, a change in presentation rate can be applied at the boundary between a part of the audio stream from a first packet and a part of the audio stream from a second packet. In some embodiments, when an audio packet is received late Audio Processing Logic 265 is configured to apply one step of acceleration at a subsequent packet boundary. Further steps of acceleration can be applied at further packet boundaries if needed. The total amount of acceleration can be a function of the total amount of delay resulting from late audio packets, the number of late packets, how late individual packets were received, and/or the like. For example, if the total delay is 200 milliseconds then the total acceleration may be 5 percent, and if the total delay is 100 milliseconds then the total acceleration may be 2.5 percent. Acceleration optionally occurs each time a packet is received late.

Deceleration of the presentation of audio packets to the user occurs when the delay resulting from late packets has been eliminated or reduced to a predetermined threshold. For example, in some embodiments, if a 200 millisecond delay is reduced to 100 milliseconds the acceleration is reduced from 5 percent to 2.5 percent in a stepwise manner. A predetermined threshold is a threshold that is determined any time before the reduction in the delay occurs. Further, the acceleration can be reduced to 1 percent when the total delay reaches 50 milliseconds. This reduction in acceleration is considered an example of deceleration as the terms are used herein.

Deceleration of audio presentation is optionally used to present audio data at a rate that is slower than the audio was originally intended to be presented. For example, audio data that was originally intended to be sampled at 40k samples/second may be sampled at 39.8k samples/second to achieve a 5 percent decrease in the presentation rate of the audio data to a user. This decrease will result in an increase of 5 percent in the time over which the audio data will be presented.

In some embodiments, the rate at which audio data is presented is decreased in anticipation of a late packet. This can reduce the lengths of gaps, such as Gaps 130B and 130C (FIG. 1), in presentation of an audio stream. For example, if the presentation time of Packet 120A is increased the length of Gap 130B will be reduced, and may be eliminated.

Anticipation of late packets can occur when, for example, a packet is received out of sequence, the number of packets in a receive buffer of Client 220A drops below a desired level, a predetermined time has passed since a last audio packet has been received, and/or the like. A predetermined amount of time is an amount of time determined any time before the last audio packet is received. Typically audio packets include a sequence identifier. For example, they may be numbered . . . , 5, 6, 7, 8, . . . . If Packet 120D (FIG. 1) is received before Packet 120C, then it can be anticipated that Packet 120C will be received late.

Client 220A may include a receive buffer having slots configured to store 1, 2, 3 or more audio packets. For example, with a two slot buffer, a first audio packet may be being processed (having been retrieved from the buffer), while a second audio packet is stored in a first slot of the receive buffer and the buffer is prepared to receive a next audio packet in a second slot. If the second audio packet is retrieved from the buffer before the next audio packet is received, then it can be anticipated that the next packet will be late. In another example, the receive buffer of Client 220A is configured to store one audio packet. A first audio packet is being processed while a second audio packet is received and stored in the receive buffer. If the processing of the first audio packet is half completed and the second audio packet is not yet received then it can be anticipated that the second audio packet will be late. If the processing of the first audio packet is 80% completed and the second audio packet is not yet received then there is an even greater probability that the second audio packet will be late.

The mechanisms used to anticipate that an audio packet will be late are optionally dependant on a history of the communication stream. For example, the probability that an audio packet will be late if the audio packet is not received by a certain time may be calculated based on the statistics of previously received packets. As these statistics can change with factors such as different communication channels, different times of day, different quality of service requirements, etc. The anticipation of whether an audio packet will be late can be calculated based on these factors.

As discussed elsewhere herein, deceleration of audio presentation may be performed in a stepwise manner. For example further steps in deceleration may be applied as it becomes more likely that a packet will be received late. In some embodiments, if no packets are received for 30 milliseconds then presentation is decelerated a first step and if packets still have not been received after 40 milliseconds then presentation is decelerated a second step, etc.

In some embodiments, gaps in an audio stream, such as Gap 130C, can be at least partially concealed or otherwise compensated for by filling the gap with filler sound generated on Client 220A. This generated filler sound can be white noise, white noise with lower intensity at higher frequencies relative to lower frequencies, continuation of a previous waveform, and/or the like. The generated filler sound is optionally dependant on the last sound of the audio stream prior to the gap. For example, the spectrum of the generated filler sound can be dependent on the frequencies of this last sound, or the generated sound can be a reverb of the last sound.

When a late audio packet is anticipated, the generated filler sound is optionally faded into the audio stream presented to the user prior to the beginning of the gap. For example, in some embodiments, 33 millisecond before an anticipated gap the generated filler sound is overlaid on the audio track. The intensity (volume) of the overlaid filler sound is optionally increased over the 33 milliseconds before the gap. If the gap actually occurs then the generated filler sound is used to fill the gap. If the gap does not occur, or when the gap ends, then the filler sound is faded away. For example, when the gap ends the generated filler sound is optionally applied as an overlay to the audio stream following the gap, with a gradually reduction in intensity. Fading the generated filler sound in and out smoothes the transitions between the presentation of audio stream received by Client 220A and the filler sound generated on Client 220A. The filler sound is optionally generated by Audio Monitoring Logic 255 or Audio Decoding Logic 260.

Audio Output 270 is configured for presenting the audio stream to the user. Audio Output 270 can include a sound card, a digital to analog converter, an amplifier, an audio jack, speakers, headphones, a wireless transmitter, and/or the like. For example, in some embodiments, Audio Output 270 includes a sound card and speakers attached to a personal computer.

Processor 275 is an electronic and/or optical processor configured to execute logic, e.g. software, included within the various components of Client 220A as discussed herein. For example, Processor 275 may be programmed with software instructions in order to perform the functions of Audio Monitoring Logic 255, Audio Decoding Logic 260, and/or Audio Processing Logic 265. Processor 275 may also be programmed with software instructions in order to execute commands or process data received by Client 220A. Client 220A optionally includes more than one instance of Processor 275. Processor 275 includes one or more hardware device.

Figure 3:
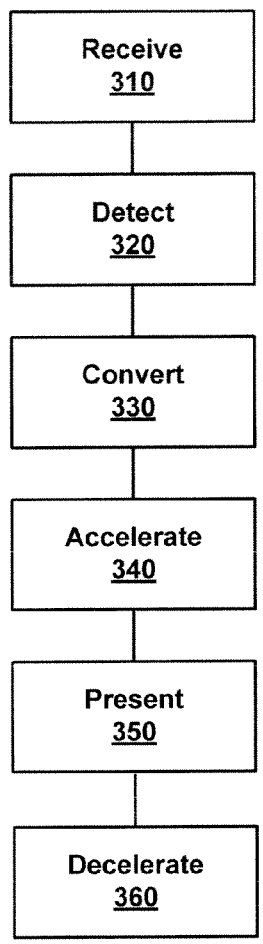
FIG. 3 illustrates methods of processing audio, according to various embodiments of the invention.

FIG. 3 illustrates methods of processing audio, according to various embodiments of the invention. In these methods the receipt of a late audio packet is detected, the presentation of one or more audio packets is accelerated in response to this detection, and the one or more audio packets are presented to a user. The acceleration of the one or more accelerated audio packets can compensate for a cumulative delay in the presentation of an audio stream that results from one or more late packets.

More specifically, in a Receive Step 310 a first audio packet, e.g., Packet 120A, is received at Client 220A via Network 215 using I/O 250. This first audio packet is any one in a series of audio packets provided to Client 220A. The series of audio packets is configured to be converted to an audio stream and presented to a user. The first audio packet is typically received from Audio Server System 210. In some embodiments, the first audio packet includes game audio generated by Audio Source 230 based on game rules and/or events within a video game. In some embodiments, the first audio packet includes audio generated at a telepresence device.

In a Detect Step 320, Audio Monitoring Logic 255 is used to detect that the first audio packet was received late. As described elsewhere herein, detection can occur by looking for gaps in an audio stream generated by Audio Decoding Logic 260, by monitoring times at which audio packets are received by I/O 250, by monitoring space available in a receive buffer, by monitoring operation of Audio Decoding Logic 260, and/or the like. Detection of a late audio packet results in a message to Audio Processing Logic 265 configured to signal that a packet was late. This massage can include the information discussed elsewhere herein.

In a Convert Step 330 Audio Decoding Logic 260 is used to convert the first audio packet to part of an audio stream. This conversion is optionally performed in accordance with a standard codex. It is generally desired that the audio stream be continuous, e.g., without gaps. However, as described herein, the receipt of a late packet can result in a gap, such as Gap 130B, in the audio stream.

In an Accelerate Step 340, a rate at which the audio stream is presented to a user is accelerated in response to the first audio packet being received late. The acceleration optionally includes presenting the audio stream at a greater data rate. For example, the data within the audio stream may be sampled faster than it would be if not accelerated. In alternative embodiments, Accelerate Step 340 includes discarding some of the received audio data and not including the discarded audio data in the audio stream. Ways of selecting which audio data to discard or ignore are discussed elsewhere herein. Accelerate Step 340 is typically performed using Audio Processing Logic 265. The part of the audio stream accelerated optionally includes audio data received within the first data packet, and may include audio data received after the first data packet.

Accelerate Step 340 is optionally performed in incremental steps. For example, the rate at which audio data is presented to the user can be accelerated in several steps and/or gradually. As described elsewhere herein, these steps can less than or equal to, for example, 0.5, 1, 2, 5, or 10 percent. Accelerate Step 340 can include using more than one incremental step to achieve an acceleration that is approximately the sum of each incremental step. The total amount of acceleration achieved in Accelerate Step 340 can be greater than 0.2, 0.5, 1, 2, 3, 5, 10 or 15 percent. The amount of acceleration can be dependent on factors discussed elsewhere herein. If presentation of an audio stream is accelerated by 2 percent 100 milliseconds of audio data will be presented in approximately 98 milliseconds, etc.

In a Present Step 350 the audio stream is presented to the user at an accelerated rate using Audio Output 270. Present Step 350 can be performed concurrently with Accelerate Step 340, e.g., the acceleration and presentation of the data can occur together.

In an optional Decelerate Step 360 the rate at which the audio data is presented to a user is decelerated. This deceleration can result in the audio data being presented at a rate that the audio data was originally configured to be presented, e.g., following deceleration 100 milliseconds of audio data will be presented in 100 milliseconds. As is discussed elsewhere herein, deceleration can be performed in more than one incremental step. In various embodiments incremental deceleration steps can be greater than 0.1, 0.5, 1, 2, 3, 5, 10 or 15 percent. Typically, Decelerate Step 360 is performed when an amount of delay in presentation of the audio data resulting from late packets has been eliminated or reduced to a predetermined level.

Figure 4:
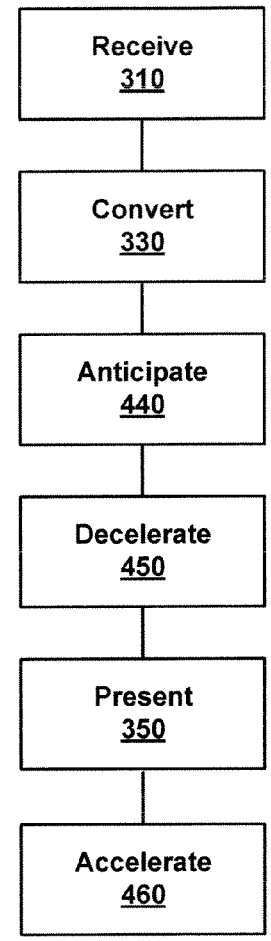
FIG. 4 illustrates methods of compensating for a late packet, according to various embodiments of the invention.

FIG. 4 illustrates methods of compensating for a late packet, according to various embodiments of the invention. The compensation includes decelerating presentation of an audio steam in anticipation that an audio packet will be received late. Deceleration results in the elimination or reduction of a gap, e.g., Gap 130B, in the presentation of the audio stream. If a packet would be late except for compensation performed using a method such as one of those illustrated in FIG. 4, it is still considered late as it still results in an added delay in the presentation of the audio stream to the user. This delay can be accumulated.

The methods illustrated in FIG. 4 include Receive Step 310 and Convert Step 330 as described elsewhere herein. In an Anticipate Step 440, it is anticipated that an audio packet will be received late. The anticipation is based on some indication that the audio packet will be late. For example, an event may or may not have occurred that indicates that there is a greater than average probability that a particular packet will be late. As used herein, the term anticipation is used with respect to a particular audio packet and reflects that the particular audio packet has a greater than average chance of being late. Anticipation is not meant to include the fact that any randomly selected audio packet will have some average chance of being late. The events that can indicate that an audio packet has a greater than average chance of being late include, for example, receiving a packet out of sequence, a number of packets in a receive buffer of Client 220A dropping below a desired level, a predetermined time passing since a last packet has been received, and/or the like. Anticipate Step 440 is optionally performed by Audio Monitoring Logic 255. The audio packet anticipated to be late may or may not actually arrive late.

In a Decelerate Step 450, the rate at which an audio stream is presented to a user is decelerated. The decelerated audio stream is the audio stream that the audio packet that is anticipated to be late is to be included. The deceleration is typically accomplished using Audio Processing Logic 265. The deceleration can be performed in more than one incremental step. In various embodiments incremental deceleration steps can be greater than 0.1, 0.5, 1, 2, 3, 5, 10, 15, 25, 33 or 50 percent. The incremental steps can be performed at least 1, 3, 5, 10, 15, 20 or 33 milliseconds apart. The particular data decelerated may be from an audio packet received before and/or after Anticipate Step 440.

As discussed elsewhere herein, in Present Step 350 the audio stream is presented to a user. In the methods illustrated by FIG. 4 the presentation occurs at the decelerated rate resulting from Decelerate Step 450. The deceleration may eliminate or merely reduce a gap, such as Gap 130B, in the presentation of the audio stream.

In an Accelerate Step 460, the presentation of the audio stream is accelerated. Accelerate Step 460 is an alternative embodiment of Accelerate Step 340 (FIG. 3) and optionally results in the audio stream being accelerated to a rate at which it was originally intended to be presented. Alternatively, Accelerate Step 460 can result in the audio stream being presented at a rate faster than it was intended to be presented. This is desirable when, for example, the audio packet that was anticipated to be late was late and resulted in a delay in the presentation of the audio stream. This may also be desirable when the audio packet was not in fact late, and the deceleration of Decelerate Step 450 has resulted in a delay in the presentation of the audio stream.

Figure 5:
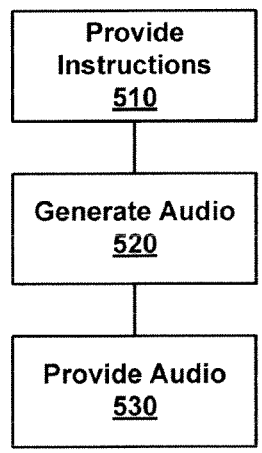
FIG. 5 illustrates methods of communicating audio packets, according to various embodiments of the invention.

FIG. 5 illustrates methods of communicating audio packets, according to various embodiments of the invention. In these methods, computing instructions are provided to Client 220A, audio packets are generated, and the audio packets are provided to Client 220A. The provided computing instructions are configured to process the provided audio packets, for example, using the methods of FIGS. 3 and/or 4. The methods of FIG. 5 may be performed by Audio Server System 210, by a network of Audio Server Systems 210, and/or the like. See, for example, the various systems taught in U.S. patent application Ser. No. 12/826,130 filed Jun. 29, 2010 and entitled "Video Game Overlay," and U.S. patent application Ser. No. 12/826,489 filed Jun. 29, 2010 and entitled "Voice Overlay."

In a Provide Instructions Step 510 computing instructions are provided to Client 220A via Network 215. These instructions are optionally communicated using a network standard such at TCP/IP. The computing instructions can include compiled code, scripts, Java®, XML, HTML, and/or the like. The computing instructions are configured to perform the methods illustrated in FIG. 3 and/or FIG. 4. For example, in some embodiments, the computing instructions are configured to detect that a first audio packet was received late by the client, and to accelerate a rate at which an audio stream is presented to a user based on the first audio packet being received late. In some embodiments, the computing instructions are configured anticipate that a second audio packet will be received late and thereby cause a gap in the audio stream, and/or decelerate a rate at which a first audio packet is presented to a user based on the anticipation that the second audio packet will be late. The computing instructions provided in Provide Instructions Step 510 are optionally further configured to receive a first audio packet via a communication network, to convert the first audio packet to part of the audio stream, and/or to present the audio stream to the user. The computing instructions are optionally provided as part of a web page.

In a Generate Audio Step 520 audio packets are generated using Audio Server System 210. The generation of these audio packets is optionally performed using the systems and methods described in U.S. patent application Ser. No. 12/826,130 filed Jun. 29, 2010 and entitled "Video Game Overlay," and U.S. patent application Ser. No. 12/826,489 filed Jun. 29, 2010 and entitled "Voice Overlay." The audio packets are optionally based on events that occur in, and/or rules of, a video game. The audio packets are typically sequential and configured to be decoded to an audio stream.

In a Provide Audio Step 530 the audio packets generated in Generate Audio Step 520 are provided from Audio Server System 210 to Client 220A via Network 215.

The steps illustrated in FIGS. 3-5 are optionally performed in orders other than those illustrated. These steps are performed using computing devices such as Audio Server System 210 and/or Clients 220.

Several embodiments are specifically illustrated and/or described herein. However, it will be appreciated that modifications and variations are covered by the above teachings and within the scope of the appended claims without departing from the spirit and intended scope thereof. For example, the systems and methods discussed herein may be applied to audio in applications other than video games and telepresence.

Further, while the discussion herein characterizes that acceleration of audio begins when a late packet arrives, in some embodiments, acceleration and deceleration are initiated based on maintaining an optimum buffer fullness. For example, accelerating may be started when there is more than an optimum number of audio packets in an receive buffer of Client 220A and/or deceleration may be started when there is less than an optimum number of audio packets in the receive buffer. There is typically some hysteresis in these limits.

In one embodiment the audio receive buffer is configured to store eight audio packets and a target is set to keep four audio packets in this buffer. When the number of packets in the receive buffer reaches six then acceleration is started and continues until the number of packets in the receive buffer again reaches four. If the number of packets in the receive buffer reaches seven or eight then the acceleration is increased by Audio Monitoring Logic 255. Thus, the rate at which an audio packet is presented to a user is regulated by the number of audio packets in the audio receive buffer. The target number of audio packets in the receive buffer may be set dynamically based on the history of lost packets. For example, if a particular communication channel is relatively unreliable relative to other communication channels, then a larger target number may be used with the particular communication channel relative to the other communication channels.

Accelerating in response to the fullness of a receive buffer is advantageous in systems were the delay of audio packets tends to come in clusters. It is sometimes preferable to have one longer gap in the presentation of audio to a user compared to a series of shorter gaps. The series of shorter gaps can result in an "audio stutter." When a gap in the presentation of audio to the user does occur, the receive buffer is optionally allowed to fill back up to the target number of audio packets before the presentation of audio is resumed.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

What is claimed is:

1. An audio system comprising:
    an input for receiving audio packets via a communication network;
    audio monitoring logic for determining that one of the audio packets was late;
    audio decoding logic for converting the audio packets to an audio stream;
    audio processing logic for accelerating presentation of part of the audio stream to a user such that delay in the presentation of the audio stream is reduced; and
    an audio output for presenting the audio stream to the user, wherein a processor executes the logic.

2. The system of claim 1, wherein the input includes an Ethernet port.

3. The system of claim 1, wherein the audio packets include video game audio data.

4. The system of claim 1, wherein the audio packets include voice audio data.

5. The system of claim 1, wherein the communication network includes the internet.

6. The system of claim 1, wherein the late audio packet was received out of sequence.

7. The system of claim 1, wherein the late audio packet was received at least 100 milliseconds late.

8. The system of claim 1, wherein the audio processing logic is configured to increment the acceleration of the presentation in a stepwise manner.

9. The system of claim 8, wherein the stepwise manner includes steps that each result in a less than 5 percent reduction in time required to present the accelerated part of the audio stream.

10. The system of claim 9, wherein the acceleration steps are applied between packets.

11. The system of claim 1, wherein the acceleration of the presentation is incremented when an audio packet is received late.

12. The system of claim 1, wherein the acceleration of the presentation is incremented each time an audio packet is received late.

13. The system of claim 1, wherein the delay is a result of the late audio packet.

14. The system of claim 1, wherein the audio processing logic is configured to reduce the acceleration of the audio stream when the accumulated delay is reduced to a predetermined level.

15. The system of claim 1, wherein the audio processing logic is configured to reduce the acceleration of the audio stream when the accumulated delay is eliminated.

16. The system of claim 1, wherein the audio processing logic is configured to reduce the acceleration of the audio stream in a stepwise manner.

17. The system of claim 16, wherein each step of the reduction is less than 5 percent.

18. The system of claim 1, wherein the acceleration is accomplished by sampling the audio data at a higher rate.

19. The system of claim 1, wherein the acceleration changes a pitch of the audio.

20. The system of claim 1, further comprising an audio server system configured to generate the audio packets.

21. A method of communicating audio packets, the method comprising:
   providing a computing instructions to a client over a communication network, the computing instructions being configured to:
      detect that a first audio packet was received late by the client, and
      accelerate a rate at which an audio stream is presented to a user based on the first audio packet being received late; and
   providing a series of audio packets to the client over the communication network, the series of audio packets including the first audio packet and being configured to be decoded to the audio stream, wherein the method is executed by a processor.

22. The method of claim 21, wherein the computing instructions are further configured to present the audio stream to the user.

23. The method of claim 21, wherein the computing instructions are further configured to convert the first audio packet to part of the audio stream.

24. The method of claim 21, wherein the computing instructions are further configured to receive the first audio packet via a communication network.

25. The method of claim 21, further comprising generating the audio packets.

26. The method of claim 21, further comprising reducing the acceleration of the presentation of the audio stream when a minimum delay in the presentation is reached.

27. A method of processing audio packets, the method comprising:
   receiving a first audio packet via a communication network;
   detecting that the first audio packet was received late;
   converting the first audio packet to part of an audio stream;
   accelerating a rate at which the audio stream is presented to a user based on the first audio packet being received late; and
   presenting the audio stream to the user at the accelerated rate, wherein the method is executed by a processor.

* * * * *